US006697316B2

(12) United States Patent
Burr

(10) Patent No.: US 6,697,316 B2
(45) Date of Patent: Feb. 24, 2004

(54) COMPENSATION OF PIXEL MISREGISTRATION IN VOLUME HOLOGRAPHIC DATA STORAGE

(75) Inventor: Geoffrey W. Burr, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 09/847,775

(22) Filed: May 1, 2001

(65) Prior Publication Data

US 2002/0172131 A1 Nov. 21, 2002

(51) Int. Cl.⁷ ................................................ G11B 7/00
(52) U.S. Cl. .................... 369/103; 365/125; 365/216
(58) Field of Search ...................... 369/103, 109.01, 369/109.02; 359/22, 25, 29, 30; 365/123, 124, 125, 215, 216, 121, 122

(56) References Cited

U.S. PATENT DOCUMENTS

| | | | | |
|---|---|---|---|---|
| 3,715,733 A | * | 2/1973 | Feiner et al. | 365/125 |
| 5,379,266 A | * | 1/1995 | Russell | 369/103 |
| 5,511,058 A | | 4/1996 | Visel et al. | 369/103 |
| 5,694,488 A | | 12/1997 | Hartmann | 382/210 |
| 5,838,650 A | | 11/1998 | Campbell et al. | 369/103 |
| 5,940,537 A | | 8/1999 | Regen et al. | 382/210 |
| 5,978,112 A | * | 11/1999 | Psaltis et al. | 369/103 |
| 5,982,513 A | * | 11/1999 | Zhou et al. | 359/25 |
| 6,111,776 A | * | 8/2000 | Russell | 365/124 |
| 6,414,296 B1 | * | 7/2002 | Edwards | 359/22 |

OTHER PUBLICATIONS

V. Vadde et al, "Channel Estimation and Intra–Page Equalization for Digital Volume Holographic Data Storage," Optical Data Storage '97, Proceedings of SPIE, Vol. 3109, pp. 245–250.

V. Vadde et al, "A Figure–of–Merit for the Optical Aperture Used in Digital Volume Holographic Data Storage," Optical Data Storage '98, Proceedings of SPIE, vol. 3401, pp. 194–200.

M. A. Neifeld, et al., "Error Correction for Increasing the Usable Capacity of Photorefractive Memories", Optics Letters, Sep. 15, 1994, vol. 19, No. 18, pp. 1482–1485.

"Post–Processing to Correct for Optical Distortion and Material Shrinkage in Holographic Data Storage", SPIE's International Technical Group Newsletter (published on the WEB), Holography, Dec. 2000, p. 4.

G. W. Burr, et al., "Compensation of Pixel Misregistration for High Density Volume Holographic Data Storage," Abstracts of OSA Annual Conference available on WEB, Aug. 2000.

G. W. Burr, et al., "Compensation for Pixel Misregistration in Volume Holographic Data Storage," Optics Letters, vol. 26, No. 8, Apr. 15, 2001, pp. 542–544.

G. W. Burr, et al., "Volume Holographic Data Storage at an Areal Density of 250 Gigapixels/in.2,"Optics Letters, vol. 26, No. 7, Apr. 1, 2001, pp. 444–446.

R. M. Shelby, et al., "Distortions in Pixel–Matched Holographic Data Storage Due to Lateral Dimensional Change of Photopolymer Storage Media," Optics Letters, May 15, 2000, vol. 25, No. 10, pp. 713–715.

(List continued on next page.)

*Primary Examiner*—Thang V. Tran
(74) *Attorney, Agent, or Firm*—Daniel E. Johnson

(57) ABSTRACT

A method of correcting errors arising from interpixel cross talk in the detection of a reconstructed holographic data image includes determining any misregistration between the pixels and the bit images. The measured output signals are then corrected to compensate for signal strength lost to or gained by nearby pixels through interference effects resulting from the misregistration, thereby producing a calculated data image that is substantially corrected for interpixel crosstalk. The relevant algorithms are provided and experimental verification is presented.

23 Claims, 8 Drawing Sheets

OTHER PUBLICATIONS

V. Vadde, et al., "Channel Modeling and Estimation for Intrapage Equalization in Pixel–matched Volume Holographic Data Storage," Applied Optics, vol. 38, No. 20, Jul. 10 1999, pp. 4374–4386.

B. M. King, et al., "Parallel Detection Algorithm for Page–Oriented Optical Memories," Applied Optics, vol. 37, No. 26, Sep. 10, 1998, pp. 6275–6298.

M. Bernal, et al., "Balancing Interpixel Cross Talk and Detector Noise to Optimize Areal Density in Holographic Storage System," Applied Optics, vol. 37, No. 23, Aug. 10, 1998, pp. 5377–5385.

R. M. Shelby, et al., "Pixel–Matched Holographic Data Storage with Megabit Pages," Optics Letters, vol. 22, No. 19, Oct. 1, 1997, pp. 1509–1511.

G. W. Burr, et al., "Modulation Coding for Pixel–Matched Holographic Data Storage," Optics Letters, vol. 22, No. 9, May 1, 1997, pp. 639–641.

F. Zhao, et al., "High Density Phase–Conjugate Holographic Memory with Phase–Only Image Compressors," Optical Memory and Neural Networks, vol. 6, No. 4, 1997, pp. 261–264.

J. F. Heanue, et al., "Signal Detection for Page–Access Optical Memories with Intersymbol Interference," Applied Optics, vol. 35, No. 14, May 10, 1996, pp. 2431–2438.

J. Ashley, et al., "Holographic Data Storage," IBM J. Res. Development, vol. 44, No. 3, May 2000, pp. 341–368.

* cited by examiner $\sigma_x > 0 \quad \sigma_y > 0$ $\sigma_x > 0 \quad \sigma_y < 0$ $\sigma_x < 0 \quad \sigma_y > 0$ $\sigma_x < 0 \quad \sigma_y < 0$

COMPENSATION OF PIXEL MISREGISTRATION IN VOLUME HOLOGRAPHIC DATA STORAGE

FIELD OF THE INVENTION

The invention relates to the field of holographic data storage, and more generally, to the problem of correcting errors that arise from the misregistration of detectors (e.g., pixels) and coherent beams of optical radiation.

BACKGROUND

The ever increasing demand for readily accessible information has been enabled by the increasing data storage capacity of computers and the decreasing cost of storing this data. Magnetic storage media have played a prominent role in the Information Age, and more recently, optical data storage technologies have become commonplace. However, both magnetic and conventional optical data storage technologies, in which individual bits are stored as distinct markers on the surface of the recording medium, are approaching physical limits beyond which the storage of even more information is impractical. Storing information throughout the volume of a medium, rather than just on its surface, appears to be a high capacity alternative to currently used information storage technologies. Holographic data storage is one such volumetric approach to data storage.

As shown in FIG. 1, with holographic data storage, an entire "page" of information in the form of bit images is recorded at one time as an optical interference pattern within a holographic storage medium 10. Lithium niobate is one photosensitive optical material commonly used in holographic storage applications. The input data to be stored in the medium 10 is optically prepared by passing an input beam 14 of that light (e.g., from a laser, not shown) through a spatial light modulator (SLM) 18. The SLM 18 functions as a "pixelated" input device and typically includes a liquid crystal panel similar to those used in laptop computers. Individual pixel elements 22 within the SLM 18 may be turned on or off (although shades of gray are also possible), as illustrated in FIG. 1 by the SLM's white and dark elements, respectively. In this manner, the input beam 14 is spatially modulated to form an object beam 26 containing a page of information determined by the particular on/off configuration of the pixel elements 22 of the SLM 18; the object beam 26 may be thought of as containing an array of individual beams (not shown in FIG. 1) corresponding to SLM pixel elements 22. This information-containing object beam 26 may then be directed through one or more optical elements 30 such as a lens and into the holographic storage medium 10. The information contained in the object beam 26 can be recorded in the storage medium 10 by intersecting the object beam with a second beam 34 of coherent light (e.g., from a laser, not shown) known as the reference beam. The reference beam 34, which is of the same wavelength as the object beam 26, is designed to be easy to reproduce, e.g., it may be simply a collimated beam having a planar wavefront. Intersecting the object beam 26 and the reference beam 34 in the storage medium 10 produces an optical interference pattern that results in chemical and/or physical changes in the medium itself, such as a change in absorption or refractive index, thereby producing a grating within the storage medium. This optical interference pattern, recorded as physical changes to the material within the storage medium 10, contains the information represented by the corresponding on/off (or gray level) configuration of the SLM pixel elements 22.

Information may be retrieved from the storage medium 10 as illustrated in FIG. 2. The reference beam 34 is directed into the storage medium 10 which has now been physically altered to contain a grating corresponding to the interference pattern generated by the intersection of the object beam 26 and the reference beam 34. When the storage medium 10 is illuminated in this manner, some of the reference beam 34 is diffracted by the grating such that a reconstructed object beam 38 emerges from the storage medium 10. This reconstructed object beam 38 contains the same information (and propagates in the same direction) as the object beam 26. The reconstructed object beam 38 may then be imaged through one or more optical elements 42 (e.g., lens) and onto a grid or array 44 of discrete detector elements 48 or pixels (e.g., an array of nominally square pixels in a charge coupled device or CCD), so that the page of information (or "data page") originally modulated onto the object beam 26 by the SLM pixel elements 22 can be retrieved. Alternatively, information may be retrieved by illuminating the storage medium 10 with a reference beam (not shown) that is phase-conjugate to the reference beam 34 (see J. Ashley et al., "Holographic data storage", IBM J. Res. Develop., vol. 44, no. 3, May 2000, pp. 341–368). This phase conjugate reference beam is diffracted by the grating within the storage medium 10 to construct a phase-conjugate object beam. A beamsplitter and a polarization element maybe used to direct this phase-conjugate object beam onto the detector array 44. The relationship between a beam and its phase-conjugate is that they have exactly the same spatial wavefront, but propagate in opposite directions (much like a movie played in reverse).

A large number of interference gratings can be formed within a single storage medium 10 by altering the angle between the object beam 26 and the reference beam 34, or alternatively, by using other wavelengths for the object and reference beams. In this manner, a large number of data pages may be stored in the storage medium, and any particular data page can be read out independently of other data pages. The theoretical limit to this volumetric approach to data storage and retrieval has been estimated to be on the order of tens of terabits per cubic centimeter. (See J. Ashley et al., supra.) Holographic data storage also offers the prospect of faster access times, since laser beams can be moved rapidly (unlike actuators used in disk drives), and the output wavelength of certain kinds of lasers can be rapidly and accurately tuned.

To retrieve data from the storage medium 10 without error, the data page represented by the complex optical wavefront of the reconstructed object beam 38 would ideally be imaged onto the pixels 48 of the detector array 44 such that each of the individual beams (not shown in FIGS. 1 and 2) corresponding to an individual SLM pixel element 22 fell onto a single pixel 48 in the detector array 44. That is, the reconstructed optical beam 38 would be imaged onto the array 44 such that there would be a one-to-one correspondence between the SLM pixel elements 22 and the detector pixels 48. In practice, such a high degree of correlation is difficult to achieve. Misfocusing of the detector array 44 (e.g., with respect to the focal plane of the optical element 42) as well as optical aberrations in the imaging system lead to a situation in which energy that was intended for a particular pixel 48 lands on one or more adjacent pixels. This misregistration of the pixels 48 with the individual beams within the reconstructed object beam 38 results in interpixel interference or crosstalk. Interpixel interference may lead to errors in the retrieved data when signals from the pixels 48 are read out to, for example, a processor or computer (as in FIG. 3 below). However, in current holographic systems, some stressing of the physical components of the holographic system beyond the point of ideal imaging may be acceptable if coding and signal processing techniques can be employed to reduce the bit error rate (BER) to a sufficiently low level.

As discussed above, each portion of the data-bearing optical wavefront intended for an SLM pixel element 22 should ideally land on a single detector pixel 48. Both the SLM 18 and the output detector array 44 typically contain pixels on a nominally square grid having a grid-spacing or pitch $\delta$. If the pixel pitches of the input and output devices are different, the optical imaging system is ideally designed to contain the appropriate magnification. However, the active area of the detector pixels 48 may be smaller than the pixels 48 themselves, giving rise to the "fill factor" of the pixel, measured either along the side of the pixel or as a fraction of the area used: active area/$\delta^2$.

To maximize storage density, the holographic recording is done at a point where the data-bearing beam is tightly focussed—often an aperture is used to prevent other portions of the storage medium from being inadvertently exposed. The smaller this aperture, however, the more the resulting pixel images are blurred at the detector array 44. The optical system is characterized by a point spread function (PSF), which is the size of the (blurred) spot found at the output image plane when a point source is placed at the input plane (or alternatively, when a hologram of this same wavefront is reconstructed). Since the aperture is finite in size, the PSF will have periodic nulls or zeroes, and the spacing between these nulls will scale inversely with the limiting aperture at the medium. In principle, crosstalk between pixels could be entirely avoided by the combination of making each pixel very small in area followed by choosing an aperture such that the spacing between the peak and the first null of the PSF is identical to the pitch of the detector pixel 48. This aperture is termed the Nyquist aperture, and it is the smallest aperture for which sufficient information can be passed from the SLM 18 to the output array 44 to guarantee the reliable retrieval of information. This aperture may be defined by the dimensions of the storage medium 10 or by a component (not shown) positioned between the SLM 18 and the detector array 44. Unfortunately, the number of photons detected at the detector array 44 must be sufficient to overcome thermal noise at the detector array, and the benefits of a detector array arising from low-crosstalk are far outweighed by the loss of signal arising from the very small fill-factor. (See M-P. Bernal et al., "Balancing interpixel cross talk and detector noise to optimize areal density in holographic storage systems", Applied Optics, vol. 37, no. 23, pp. 5377–5385, 1998).

Linear signal processing techniques such as equalization, Wiener filtering, and partial-response-maximum-likelihood have had great success in deblurring the temporal 1-D channels found in conventional storage and communications systems. (See J. W. M. Bergmans, *Digital baseband transmission and recording*, Kluwer Academic Publishers, Boston, 1996.) This success led some investigators to propose signal processing schemes for page-oriented data storage that extend existing 1-D algorithms to 2-D but retain a simple linear channel model. (J. F. Heanue et al., "Signal detection for page-access optical memories with intersymbol interference", Applied Optics, vol. 35, no. 14, pp. 2431–2438, 1996; V. Vadde et al., "Channel modeling and estimation for intrapage equalization in pixel-matched volume holographic data storage", Applied Optics, vol. 38, no. 20, Jul. 10, 1999; and B. M. King et al., "Parallel detection algorithm for page-oriented optical memories", Applied Optics, vol. 37, no. 26, Sep. 10, 1998.) Their reasoning was that by correcting the blur introduced by diffraction, it should be possible to work with smaller spatial apertures and thus higher areal densities.

However, the performance improvements achieved in holographic data storage systems using these techniques have been less dramatic than those achieved in 1-D systems. One reason for this is that the detection of the intensity of a coherent optical wavefront is an inherently nonlinear process, in which the electric fields (not the intensities) of two or more beams constructively or destructively interfere with each other. The resulting optical intensity at any given point is given by summing the electric fields from all the beams arriving at that point and squaring this sum. The intensity at each point of a pixel may depend (at least in part) on electric fields from signals that would have landed onto nearby pixels in the absence of misregistration. Each detector pixel integrates intensity over that pixel's area to generate an output signal, in which the intensity at each point is given by summing the square of the total electromagnetic field at that point. Thus, in the absence of interference effects arising from coherent light, intensities from two or more different beams would simply add. With coherent light, however, deconvolving the intensity data from a pixel array to establish what the intensity data would have been in the absence of interference effects arising from misregistration is fundamentally a nonlinear process.

The problem of misregistration has typically been addressed through careful (but costly) engineering. The optical components between the SLM 18 and the detector array 44 can be configured to minimize optical distortion and magnification error, but simultaneously achieving high storage density and compact system size can be difficult. Alternatively, phase-conjugate readout can be used to reduce the impact of aberrations in most but not all of the optical system (F. Zhao et al., "High density phase-conjugate holographic memory with phase-only image compressors", Optical Memory and Neural Networks, vol. 6, no. 4, pp. 261–264, 1997). In either case, however, precise optomechanical mounting and some degree of lateral position feedback are necessary to achieve and maintain alignment. In practice, small data pages can almost be perfectly pixel-matched, i.e., the problem of misregistration can be, for all practical purposes, eliminated. However, with large mega-pixel or megapel (1024×1024) data pages, a significant fraction of the signal-to-noise (SNR) budget can be consumed by even a small amount of optical distortion: In practice, one part of a data page must be slightly misaligned in order to bring another part of the data page into perfect alignment. Thus, there remains a need for a method of compensating for the errors resulting from the misregistration of a data page with an array of detector pixels.

SUMMARY

One aspect of the invention is a processor-implemented method of determining the intensities of beams of coherent electromagnetic radiation, in which the beams form an array. The method comprises providing an array of detectors and imaging the array of beams onto the array of detectors to generate output signals from the detectors. The output signals are detected to record respective output signal levels, and the misregistration between the detectors and the beams is determined. A processor is used to correct the recorded output signal levels by compensating for electromagnetic interference effects at the detectors arising from the misregistration, so that the corrected output signals levels are proportional to those that would be recorded in the absence of misregistration. In a preferred implementation, the detector array is a two-dimensional array of pixels. The array may include at least (or exactly) 1024×1024 pixels, or it may include at least (or exactly) 1024×768 pixels. In one preferred implementation, the coherent radiation includes laser light.

Determining the misregistration may advantageously include determining a set of static misregistrations between the detectors and the beams, determining any dynamic misalignment between the array of detectors and the array of beams, and then determining a set of total misregistrations between the detectors and the beams from the dynamic misregistration and the set of static misregistrations. In a preferred implementation, determining the dynamic misalignment between the array of detectors and the array of beams includes identifying the location of fiducial images on the detector array. The imaging of the array of beams preferably includes directing a beam of laser light through a holographic storage medium to reconstruct the array of beams. In one preferred implementation, compensating for electromagnetic interference effects includes determining, for each detector, the convolution of the optical point spread function (PSF) of beams in the array and the detector's area. The compensating preferably includes performing iterative calculations in a first spatial dimension for detectors along a given row aligned along the first spatial dimension, and advantageously further includes performing iterative calculations in the first spatial dimension for detectors along additional rows aligned along the first spatial dimension. The compensating preferably further includes performing iterative calculations in a second spatial dimension for detectors along rows aligned with the second spatial dimension.

Another aspect of the invention is a processor-implemented method of correcting errors arising from interpixel cross talk in the detection of a reconstructed holographic data image, in which the data image includes a two dimensional grid of bit images arranged in rows and columns. The method includes providing a detection device having a grid of detector pixels, in which the detector pixels correspond to and detect the bit images. The data image is directed onto the detector pixels by passing coherent electromagnetic radiation through a holographic storage medium, and output signals are measured from the detector pixels. Any misregistration between the pixels and the bit images is determined, and a processor is used to correct the measured output signals to compensate for signal strength lost to or gained by nearby pixels through interference effects resulting from the misregistration, thereby producing a calculated data image that is substantially corrected for interpixel crosstalk. In a preferred implementation, the misregistration includes determining any dynamic misalignment between the image grid and the pixel grid, and determining any static misregistrations between the bit images and the pixels.

Correcting the measured output signals may advantageously include (a) for each pixel in a given row of pixels, adding to the output signal measured at that pixel any signal lost through interference effects to neighboring pixels in the given row, (b) for each pixel in the given row, subtracting from the output signal measured at that pixel any signal gained through interference effects from neighboring pixels in the given row, and (c) applying (a) and (b) to additional rows of pixels, thereby producing a data image of revised output signals. Correcting the measured output signals may further include (d) for each pixel in a given column of pixels, adding to the revised output signal for that pixel any signal lost through interference effects to neighboring pixels in the given column, (e) for each pixel in the given column, subtracting from the revised output signal for that pixel any signal gained through interference effects from neighboring pixels in the given column, and (f) applying (d) and (e) to additional columns of pixels. Analogous methods may be employed, in which columns are processed before rows.

A preferred implemenation includes iteratively processing the output signals from the detector pixels along a first dimension to produce an intermediate page of intensities, and processing the intermediate page intensities along a second dimension to produce the calculated data image. In one preferred implemenation, patterns of discrete bit images are imaged onto the detector pixels to determine the extent of the interference effects resulting from misregistrations between detector pixels and their respective bit images. In a preferred implementation, output signals are iteratively processed back and forth along each row to generate respective revised data signals, and output signals are iteratively processed back and forth along each column to generate respective revised data signals, in which only those revised data signals for which pixel offsets are less than or equal to one-half of the pixel spacing are retained. In another implementation, output signals are iteratively processed back and forth along each row to generate respective revised data signals, and output signals are iteratively processed back and forth along each column to generate respective revised data signals, in which, for at least some detector pixels, an average of the revised data signals is calculated. The method advantageously comprises including blank rows and columns in the data image to facilitate correcting of the measured output.

DETAILED DESCRIPTION OF THE PREFERRED EMBODIMENTS

Figure 2:
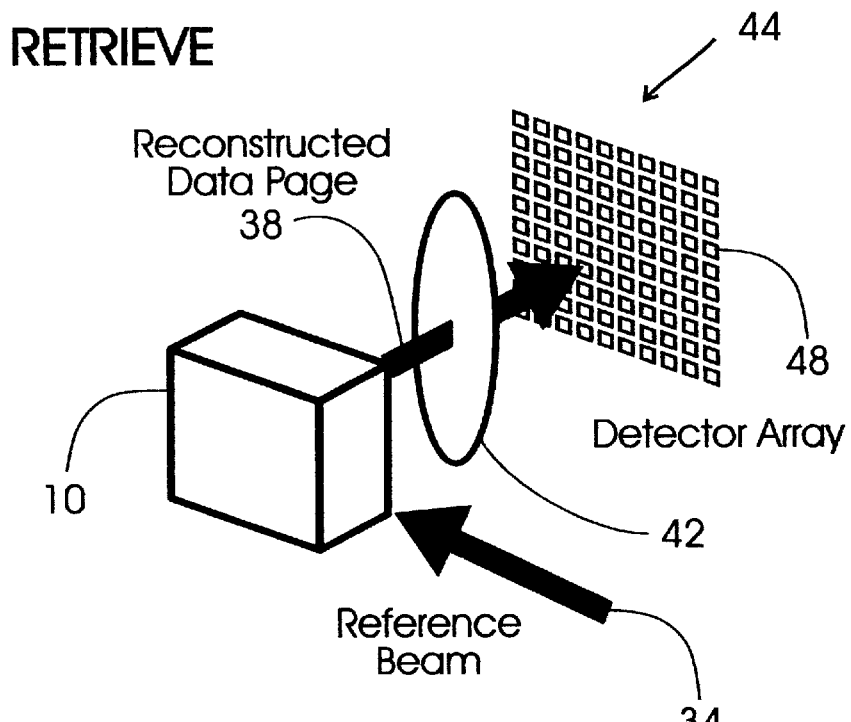
FIG. 2 illustrates how the information in the data page recorded in FIG. 1 can be retrieved using a coherent beam of light.
Figure 3:
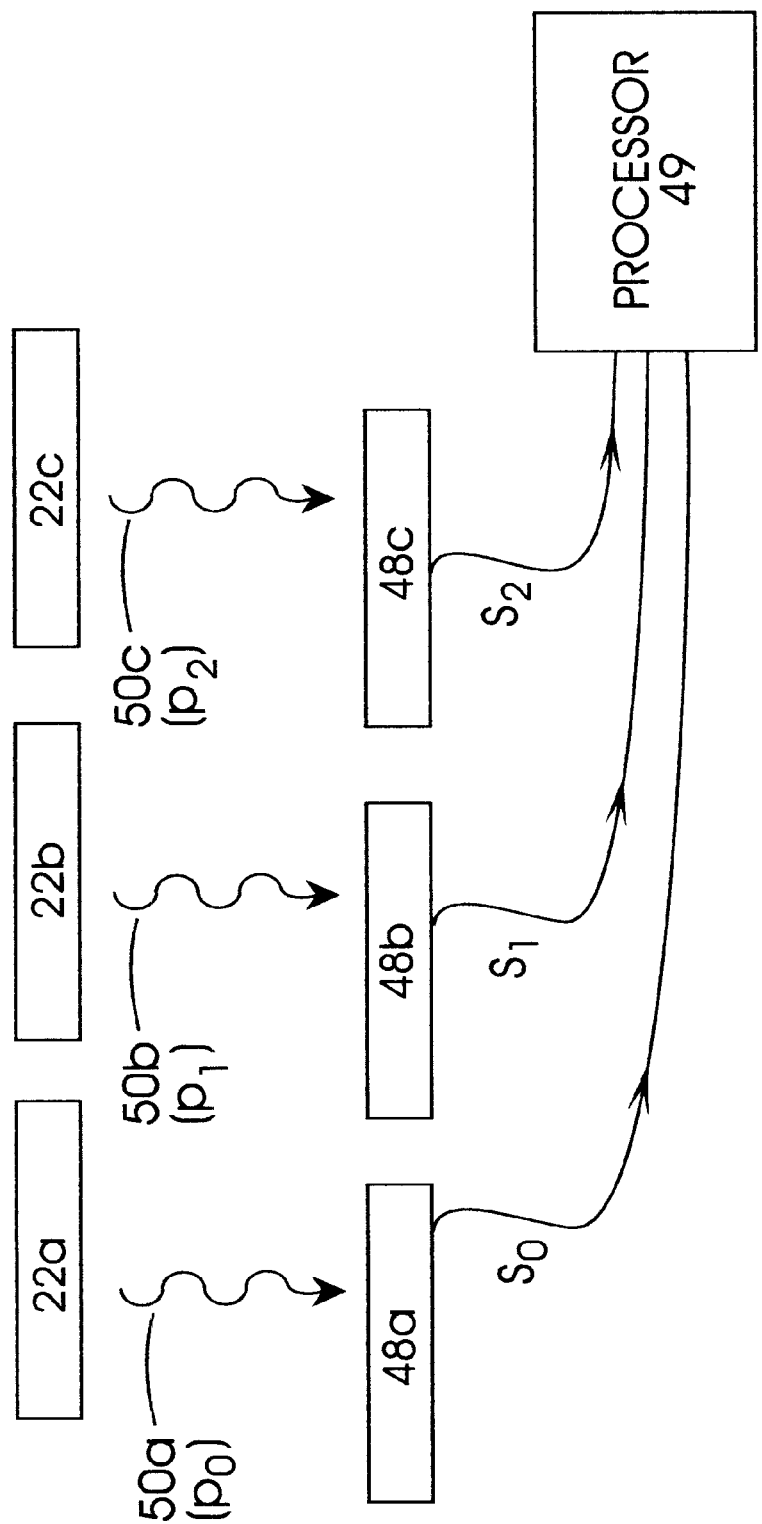
FIG. 3 shows optical beams in a pixelated data page (corresponding to pixels in the SLM) propagating towards pixels of a detector array, in which the optical beams are shifted to the right of the detector pixels.

A pixel shift-compensation algorithm is derived by considering the physical readout process used for holographic data storage. FIG. 3 shows a one dimensional (1-D) slice through three detector pixels 48a, 48b, 48c that record and then read out respective optical intensities $S_0$, $S_1$, $S_2$ to a processor 49. The processor may be a computer or a microcomputer, e.g., a microprocessor having dedicated hardware logic and/or software for performing the methods described herein. (Alternatively, the methods herein may be implemented off-line in a computer by reading out data from the processor 49 to the computer.) The three detector pixels 48a, 48b, 48c are shown receiving optical beams (i.e., "bit images") 50a, 50b, 50c (having respective intensities $p_0$, $p_1$, $p_2$) associated with SLM pixel elements 22a, 22b, 22c. The SLM pixel elements 22a, 22b, 22c are only included in FIG. 3 for illustrative purposes, as the SLM 18 need not be present during the readout process (see FIG. 2). Nevertheless, including the SLM pixel elements 22a, 22b, 22c in FIG. 3 helps facilitate the discussion, since the reconstructed object beam 38 includes optical beams (such as 50a, 50b, 50c) that are associated with the SLM pixel elements 22 as a result of the holographic storage process (see FIG. 1). The misregistration that occurs between the detector pixels 48a, 48b, 48c and the optical beams 50a, 50b, 50c may thus be thought of as a misregistration between the SLM pixel elements 22a, 22b, 22c and the detector pixels 48a, 48b, 48c.

In this example, the optical beams 50a, 50b, 50c overlap with each other—more precisely, their respective electromagnetic fields 54a, 54b, 54c interfere with each other at the detector pixels 48a, 48b, 48c, and this interference necessitates deconvolving the output signals to determine the intensities of the individual beams 50a, 50b, 50c. This interference is illustrated schematically in FIG. 4, in which the relative strengths of the electromagnetic fields 54a, 54b, 54c at the detector pixels 48a, 48b, 48c are shown as a function of position along the x-axis. The electromagnetic fields 54a, 54b, 54c are seen in this example to be centered about the SLM pixel elements 22a, 22b, 22c, but slightly offset from their respective detector pixels 48a, 48b, 48c by an amount $\sigma_x$. This offset $\sigma_x$ arises from the misregistration between the SLM pixel elements 22a, 22b, 22c and the detector pixels 48a, 48b, 48c in the x-direction; $\sigma_x$ is the total misregistration in the x-direction arising from any source whatsoever, including optical distortion, magnification error, and material shrinkage. (See R. M. Shelby et al., "Distortions in pixel-matched holographic data storage due to lateral dimensional change of photopolymer storage media, Optics Letters, vol. 25, no. 10, pp. 713–715, May 15, 2000.) Thus, $\sigma_x$ itself may vary slowly across the page.

Figure 1:
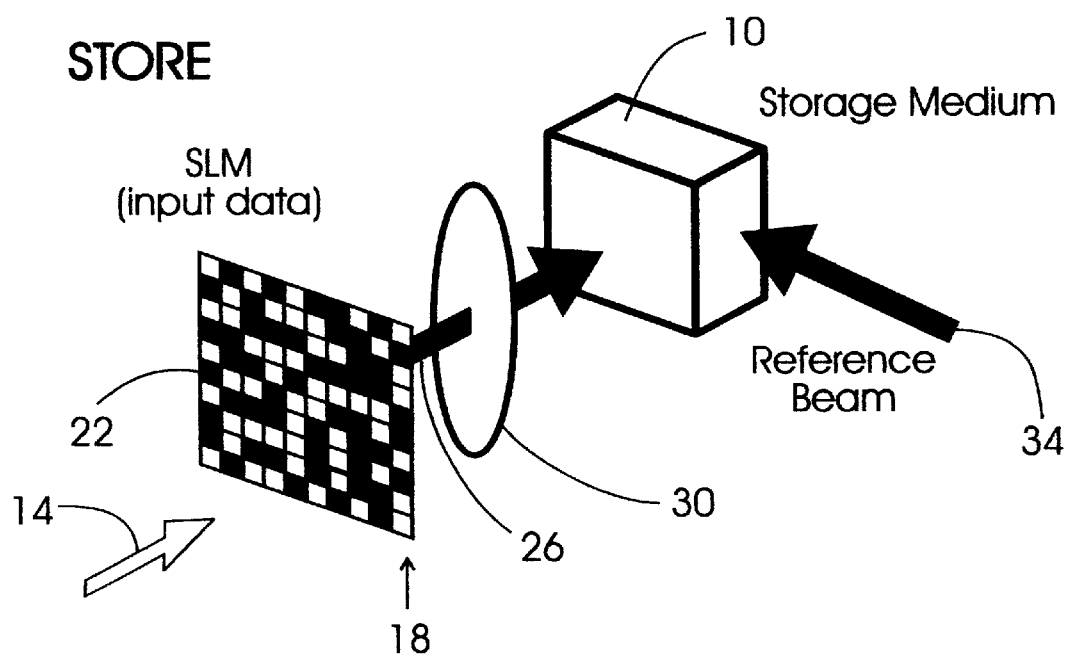
FIG. 1 illustrates how a spatial light modulator (SLM) can be used in combination with two coherent beams of light to store a data page of information in a photosensitive material.
Figure 4:
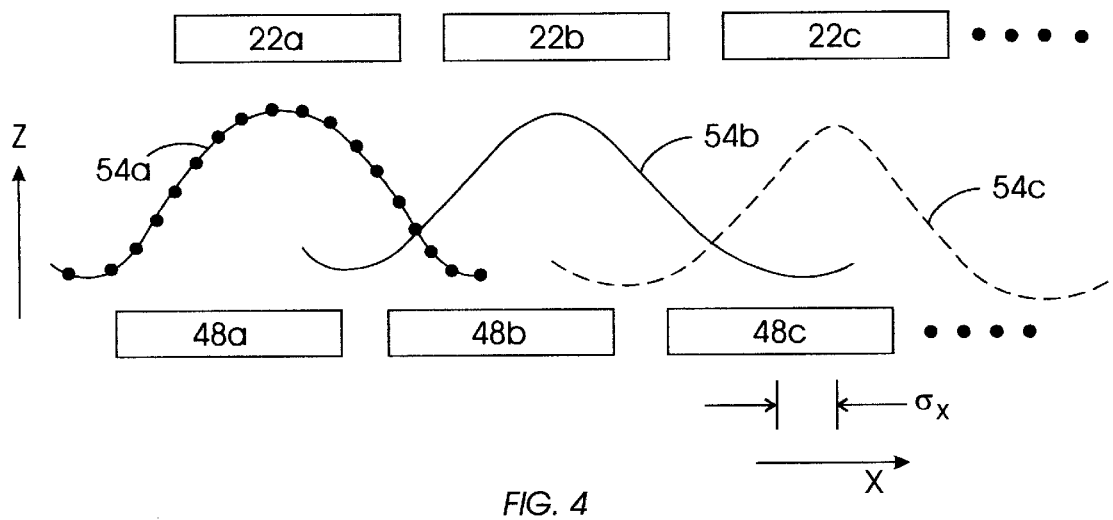
FIG. 4 shows how electric fields from the optical beams of FIG. 3 may interfere with each other at the detector pixels.

In FIG. 4, the relative strengths of the electromagnetic fields 54a, 54b, 54c at the detector pixels 48a, 48b, 48c (as a function of position along the x-axis) are indicated in the z-axis for the sake of illustration. It will be understood by those skilled in the art that the amplitude of an electromagnetic field is a scalar quantity and has no particular orientation, even though the electromagnetic fields themselves may be thought of as propagating towards the detector pixels. Each of the electromagnetic fields 54a, 54b, 54c has been "blurred" by the optical system, and this blurring is characterized by the optical system's point spread function (PSF). The relative electromagnetic field strength associated with each SLM pixel element 22, at the detector array 44, is denoted here by h(x) and is a function of position along the x-axis. The function h(x) can be calculated first by noting that the fill factor $ff_s$ for each of the SLM pixels elements 22 is constant. For convenience, a "4-F" (i.e., four focal lengths) system is considered as shown in FIGS. 1 and 2, in which the storage medium 10 is located at the back focal plane of a first lens 30 and at the front focal plane of a second lens 42, completing the imaging system from the SLM 18 to the detector array 44. Taking the Fourier transform aperture to be a square with sides of length D, h(x) is simply the convolution of the SLM pixel element and the sinc function PSF (see J. W. Goodman, *Introduction to Fourier Optics*, McGraw-Hill, 1968), $$h(x) \equiv c \int_{-ff_s/2}^{ff_s/2} \mathrm{sinc}\left(\frac{D}{D_N}(x-x')\right) dx', \quad (1)$$

where sinc(x)=sin(Πx)/(Πx). Here, c is chosen such that h(x) is properly normalized:

$$\int_{-\infty}^{\infty} h^2(x) dx = 1 \quad (2)$$

Here $D_N = \lambda f/\delta$ is the Nyquist aperture defined in terms of the wavelength of the coherent radiation, the focal length of the optical system, and the pitch of the detector pixels 48. Note that position along the x-axis may be conveniently normalized to the pitch $\delta$ of the detector pixels 48, so that x is a measure of the number of pixels along the x-axis.

The signal intensities of the optical beams 50a, 50b, 50c (associated with the SLM pixel elements 22a, 22b, 22c, respectively), which are transmitted from the storage medium 10 to the detector array 44, are denoted by $p_0$, $p_1$, and $p_2$, respectively. If the PSF is no broader than the pitch $\delta$ of the detector pixels 48, so that the amount of power lost into the second nearest pixel is insignificant, and if the offset $\sigma_x$ between the SLM pixel elements 22a, 22b, 22c and their corresponding detector pixels 48a, 48b, 48c is non-zero, then it can be assumed that most of the signal detected by the detector pixel 48c comes from the SLM pixel elements 22b and 22c. In this case, $S_2$ is given by:

$$S_2 = \int_{-ff_d/2}^{ff_d/2} \left[\sqrt{p_2}\, h(x-\sigma_x) + \sqrt{p_1}\, h(x-\sigma_x+1)\right]^2 dx. \quad (3)$$

where $ff_d$ is the fill factor of the detector. As shown in Equation 3, optical intensity at any given point is given by summing all of the electromagnetic fields that contribute to the optical intensity at that point and then squaring the result. The total optical intensity $S_2$ (which is measured by the pixel 48c) can then be calculated through the appropriate integration.

Equation 3 gives a representation of the output $S_2$ (which is uncorrected for misregistration) that is attributed to the pixels 22b and 22c for a known shift $\sigma_x$. The objective is to invert Equation 3, using the measured values $S_1$ and $S_2$ and the known shift $\sigma_x$, to compute $p_2$. To solve Equation 3 for $p_2$, it is convenient to introduce some abbreviations.

Equation 3 can be written as three separate terms:

$$S_2 = p_2 H_{00}(\sigma_x) + 2\sqrt{p_1 p_2} H_{01}(\sigma_x) + p_1 H_{11}(\sigma_x). \quad (4)$$

Each of the three terms in Equation 4 represents a contribution to the measured signal $S_2$ and is expressed as the product of an intensity ($p_1$, $p_2$) and a term $H_{ij}(\sigma_x)$ that arises from the fact that the optical system is misaligned. The first term represents the energy transmitted by the SLM pixel 22c and received by the detector pixel 48c, and is given by $$H_{00}(\sigma_x) \equiv \int_{-ff_d/2}^{ff_d/2} [h(x - \sigma_x)]^2 \, dx. \quad (5)$$

The two digits in the subscript serve as a mnemonic that this is the electric field contribution from the SLM pixel having an associated offset of "0" (in this case, the pixel 22c), multiplied by itself. In the absence of misregistration, this would be the only non-zero term. However, when there are misregistrations between the optical beams 50a, 50b, 50c and the detector pixels 48a, 48b, 48c, respectively, then a neighboring pixel will receive unintended signal: the electromagnetic field contribution from the SLM pixel having an associated offset of "1" (in this case, the pixel 22b), multiplied by itself, is given by $$H_{11}(\sigma_x) \equiv \int_{-ff_d/2}^{ff_d/2} [h(x - \sigma_x + 1)]^2 \, dx. \quad (6)$$

This is the fraction of $p_1$ from the optical beam 50b inadvertently received through interpixel crosstalk at the pixel 48c when the pixel 22b is turned ON.

If the optical system used incoherent light, then the two terms given by Equations 5 and 6 would be the only ones required. One would find that one could solve explicitly for $p_2$ by a linear equation involving $S_1$ and $S_2$, and it would be possible to incorporate a correction involving $S_3$ (i.e., the signal originating from the pixel to the right of the pixel 48c, which is not shown). However, with coherent light, the signal $S_2$ is not simply the sum of the contribution due to the pixel 22c and the contribution due to the pixel 22b, but it also includes the indicated interference term. When $p_2$ and $p_1$ are 1.0, this interference term is $$H_{01}(\sigma_x) \equiv \int_{-ff_d/2}^{ff_d/2} h(x - \sigma_x) h(x - \sigma_x + 1) \, dx. \quad (7)$$

When the Fourier transform aperture is between 1 and 2 times the Nyquist aperture, then this integral is generally positive, implying that there is constructive interference between the beams 50b and 50c at the pixel 48c. Since power must be conserved across the data page, expanding the limits of the integral in Equation 7 to infinity should result in zero net added signal. The constructive interference encountered at the pixel 48c must thus be compensated by destructive interference at surrounding pixels. For instance, if $H_{01}$ is positive, leading to an increase in $S_2$, then $S_3$, $S_1$, and $S_0$ may be correspondingly reduced. However, in the preferred embodiment, these second-order effects are ignored for simplicity and do not seem to have much impact on performance.

The interference between pixels can be other than constructive if the SLM pixels 22a, 22b, 22c modulate not only the amplitude but also the phase of the electromagnetic field incident upon them. This may be done intentionally in order to distribute energy throughout the Fourier transform plane, with the idea that the phase will be unimportant to the intensity-based detectors. (This could be done with a programmable device capable of modulating both phase and amplitude, but using a fixed phase mask carefully aligned over the SLM 18 is more practical.)

In terms of Equation 4, one can consider the case in which the SLM 18 modulates the pixels with amplitude and phases $a_1 \exp(j\phi_1)$ and $a_2 \exp(j\phi_2)$, such that $$p_1 \equiv a_1^2 \quad p_2 \equiv a_2^2. \quad (8)$$

The only modification to Equation 4 is then in its second term, so that $S_2$ becomes $$S_2 = \ldots + 2a_1 a_2 \cos(\phi_1 - \phi_2) H_{01}(\sigma_x) + \ldots \quad (9)$$

In the absence of a random phase mask, $\phi_1$ and $\phi_2$ are equal and the cosine term is 1, so that Equation 9 reduces to Equation 4. With a phase mask, the $\phi_1 - \phi_2$ term may vary from pixel to pixel, so that some pixels experience constructive interference while others experience destructive interference. However, if the shift-compensation algorithm has knowledge of the original pattern of phase terms that were applied when the page was stored, then the appropriate terms can be applied in Equation 9.

An objective of the shift-compensation algorithm disclosed herein is to determine the intensities that would have been recorded by the detector pixels 48a, 48b, 48c in the absence of misregistration. As described above, once the shift $\sigma_x$ due to all contributing factors is known, the values of the three $H_{ij}$ terms can be computed. The value of $S_2$ is the signal returned by the detector pixel 48c and is a function of two unknowns: $p_2$ and $p_1$. If $p_1$ is known, then Equation 4 can be used to solve for $p_2$ and vice-versa, by writing it as a second-order polynomial in $(p_2)^{1/2}$:

$$0 = (\sqrt{p_2})^2 [H_{00}(\sigma_x)] + \sqrt{p_2} [2\sqrt{p_1} H_{01}(\sigma_x)] + [p_1 H_{11}(\sigma_x) - S_2], \quad (10)$$

and then solving for $(p_2)^{1/2}$ with the binomial equation, thereby yielding:

$$\sqrt{p_2} = \frac{1}{H_{00}(\sigma_x)} \Big[ -(\sqrt{p_1} H_{01}(\sigma_x)) + \sqrt{p_1((H_{01}(\sigma_x))^2 - (H_{00}(\sigma_x) H_{11}(\sigma_x))) + (H_{00}(\sigma_x) S_2)} \Big] \quad (11)$$

In order to use Equation 11, the value of $p_1$ must already be known. An equation analogous to Equation 11 can be written for $p_1$ in terms of $S_1$ and $p_0$, but at some point, the algorithm must be "seeded" with prior knowledge about one of the pixels in order to solve for the other intensities $p_1$. One way to do this is to leave a blank pixel at the end of the row. Thus, if the pixel 22a has been intentionally left OFF, then $p_0$ is zero and $p_1$ is simply $S_1/H_{00}(\sigma_x)$. This value for $p_1$ can then be substituted into Equation 11 to solve for $p_2$. The shift compensation algorithm outlined here simply proceeds in an iterative fashion along an entire row, solving for the intensity that would have been recorded at each pixel in the absence of misregistration by using the calculated intensity of the just-processed, neighboring pixel. At each pixel, the algorithm starts with the measured signal $S_i$, subtracts a portion that "belonged to" the previous pixel, subtracts a further portion due to interference, and then factors in the missing signal that should have been there but actually fell into the next pixel. While the algorithm requires a priori information about the shift $\sigma_x$ and the associated weighting factors $H_{ij}(\sigma_x)$, no information about the binary pixel states or special encoding arrangement is required (other than that the pixel at the end of a row turned OFF, as discussed above). Note that the value of $\sigma_x$ can change from pixel to pixel without loss of generality. (However, for each iterative step, only one value $\sigma_x$ is used for the three terms in Equation 4.)

Figure 5:
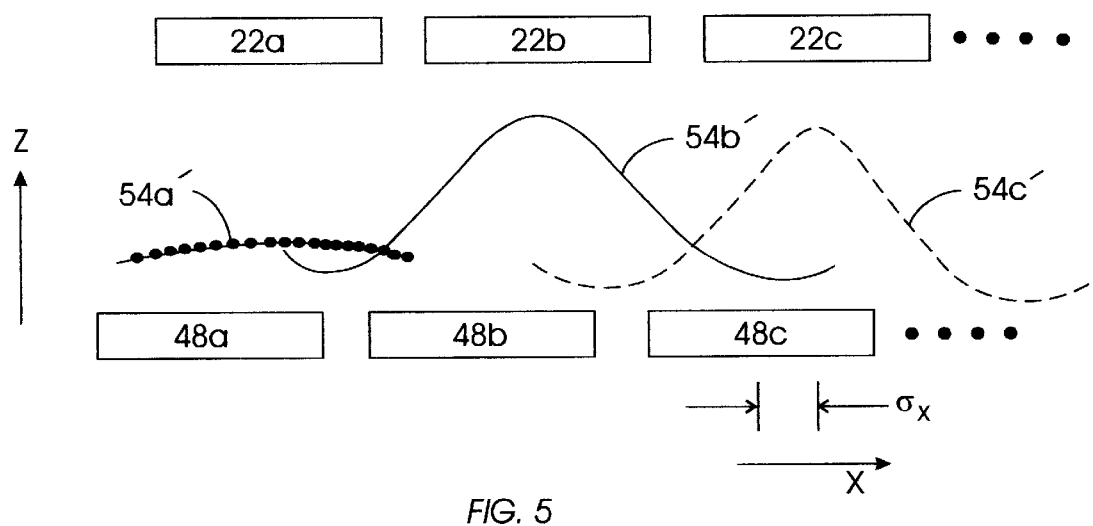
FIG. 5 shows electric fields from the optical beams of FIG. 3 interfering at the detector pixels in the case that one of the optical beams has been turned off.

In FIG. 5, the detector pixels 48a, 48b, 48c are shifted slightly leftward from the corresponding SLM pixels 22a, 22b, 22c, and the SLM pixel element 22a has been turned off, so that its corresponding electromagnetic field 54a' is essentially zero. The electromagnetic fields 54b' and 54c' are non-zero, however. The situation presented in FIG. 5 lends itself to solution using the methodology just outlined. In this case, the pixel 22a has been set OFF, and $p_1$, $p_2$, and the calculated intensities corresponding to other detector pixels in the same row can now be determined. In the example of FIG. 5, the SLM pixel to the left of the pixel under consideration contributes most of the "crosstalk". Accordingly, processing takes place from left to right.

Figure 6:
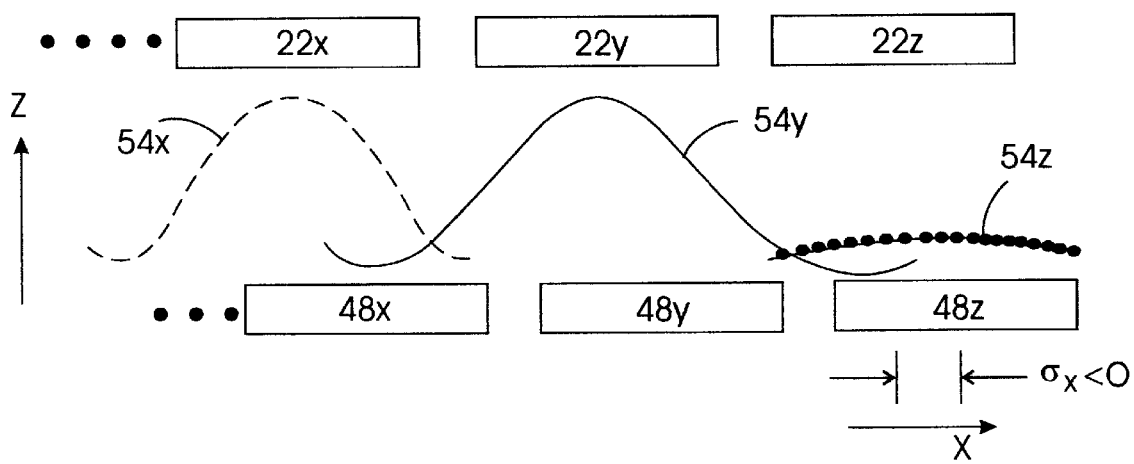
FIG. 6 shows electric fields from optical beams interfering at detector pixels in the case that one of the optical beams has been turned off, and with the optical beams shifted to the left of the detector pixels.
Figure 7A:
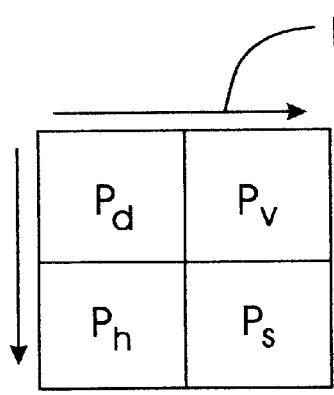
FIG. 7, which includes FIGS. 7A, B, C, and D, illustrates how the preferred order in which signals from the detector pixels are processed can vary depending upon how the pixelated data page is aligned with the detectors in the detector array.
Figure 7B:
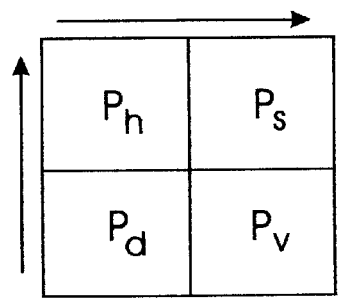
Figure 7C:
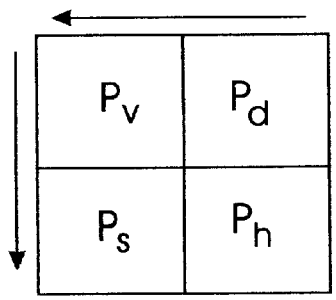
Figure 7D:
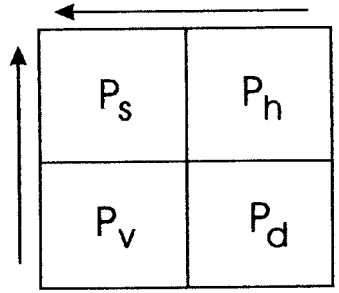

FIG. 5 shows the left hand end of a row of pixels seeded on the left hand side with the pixel 22a seeded OFF, and with processing taking place from left-to-right. In contrast, FIG. 6 shows the right hand end of a row of pixels, in which detector pixels 48x, 48y, 48z are shifted slightly rightward with respect to the SLM pixels 22x, 22y, 22z (having associated electromagnetic fields 54x, 54y, 54z, respectively). In this case, $\sigma_x$ is negative, and the SLM pixel to the right of the pixel under consideration contributes most of the significant crosstalk. Thus, it is preferable to process the row shown in FIG. 6 from right-to-left, using the following alternate equations for $H_{11}$:

$$H_{11}(\sigma_x) \equiv \int_{-ff_d/2}^{ff_d/2} [h(x - \sigma_x - 1)]^2 \, dx, \qquad (12)$$

for $H_{01}$, $$H_{01}(\sigma_x) \equiv \int_{-ff_d/2}^{ff_d/2} h(x - \sigma_x) h(x - \sigma_x - 1) \, dx, \qquad (13)$$

and for $S_2$ $$S_2 = p_2 H_{00}(\sigma_x) + 2\sqrt{p_{3p_2}} H_{01}(\sigma_x) + p_3 H_{11}(\sigma_x). \qquad (14)$$

Accordingly, the pixels at both ends of a row are preferably left OFF, one to seed the left-to-right pass (as discussed above) and one to seed the right-to-left pass.

If $|\sigma_x| > 0.5$, then the term $p_1 H_{11}(\sigma_x)$ in Equation 4 becomes large, and the algorithm becomes prone to error-propagation. In this case, the correction factors to be applied to each pixel become large, and any random noise (arising from scattering or detector noise) from a given pixel is "amplified" along with the signal to affect the intensity calculated for the next pixel, leading to greater error as the algorithm proceeds iteratively along the row. For instance, when the pixel shift is small, perhaps 80% of the energy falls on the "correct" (intended) pixel and 20% on an adjacent, unintended pixel. Thus, if a signal of 100 (in units of the 8-bit gray-level camera signal) is received, the algorithm calls for increasing this by a factor of 1.25 (essentially "returning" the energy to the intended pixel from its neighboring pixel). If random noise results in a larger signal of 105, this factor of 1.25 increases the error in the calculation only slightly, to about 6 more than the corrected value of 125. However, if 20% of the energy falls on the intended pixel, and 80% on a neighboring pixel, the situation is quite different. Now the algorithm calls for a correction factor of 5, so that those 5 units of noise (when multiplied by 5) become 25 units. Error can thus propagate throughout subsequent pixel value calculations.

For this reason, it is preferred to process each row back and forth: once from left-to-right to compensate for rightward shifts of up to half a pixel as in FIG. 5, and once from right-to-left for leftward shifts as in FIG. 6. The signal recorded from each pixel in a row is processed on both "passes", but only one of the two results is saved. Continuing the discussion related to the situation just described, imagine that the pixel 48b loses only 20% of its energy to its neighboring pixel 48c. On the left-to-right pass, the factor of 1.25 boosts the corrected signal from 100 to 125, and the pixel 48c "loses" 25 counts of its signal (not considering any signal correction arising from the interference term between these 25 counts and the signal arising from the intensity $p_2$.) However, on the right-to-left pass, the same pixel 48b now encounters the other scenario, because it is the 20% of the signal that has been misplaced" into the pixel 48c that is encountered first when iteratively calculating from right-to-left. After the signal from 48c is processed on this right-to-left pass, there is only a small amount of leftover energy (the missing 20%), which is multiplied by a correction factor of 5 to estimate a corrected signal for the pixel 48b. In this case, the value calculated for the intensity from the pixel 48b in the right-to-left pass is discarded, while the value from the left-to-right pass is retained. Nevertheless, the pixel 48b cannot be ignored on the right-to-left pass: The next pixel 48a might have a smaller $\sigma_x$, and the resulting intensity for the pixel 48b calculated by the iterative algorithm will seed that next pixel's intensity calculation.

Note that a pixel shift of exactly one pixel requires only bookkeeping (e.g., imagine that the optical beam 50a from the pixel 22a lands on the pixel 48b, and the optical beam 50b from the pixel 22b lands on the pixel 48c), and blank columns at the page boundaries can be used to prevent data from being lost off the edge of the data page. These blank columns also serve to seed the algorithm as discussed above. Further, for purposes of the shift compensation algorithm, a shift of 0.75 can be treated as a pixel shift of 1 pixel (which can be handled through bookkeeping) with $\sigma_x$ set equal to −0.25. By extension, if the shift compensation algorithm works well for all shifts in the range $-0.5 < |\sigma_x| < 0.5$, then the algorithm is relatively insensitive to misalignment. Unfortunately, the transition at $|\sigma_x| \sim 0.5$ is problematic, especially if the estimate of the shift is flawed. The problem here is that the intensities calculated by the algorithm vary rapidly as a function of $\sigma_x$ when $|\sigma_x|$ is close to 0.5. For example, in the context of the 80%/20% scenario example above, a slightly different $\sigma_x$ might lead to a division of energy of 75%/25%. The correction factor in one direction changes only from 1.25 to 1.333, while in the other direction it changes from 5 to 4. To reduce this effect, any pixel for which $|\sigma_x| > 0.4$ is preferably processed on both the left-to-right and right-to-left passes, and a weighted average of the two estimates is made.

To extend the shift compensation algorithm to 2-D, one can extend the analysis of Equation 4 to three neighboring pixels (horizontal, vertical, and diagonal), producing an equation for calculated (i.e., corrected) intensity that has four linear and six nonlinear terms:

$$S_s = p_s H_{ss} + p_h H_{hh} + p_v H_{vv} + p_d H_{dd} + 2\sqrt{p_s}$$
$$p_h H_{sh} + 2\sqrt{p_{sp_v}} H_{sv}$$
$$+2\sqrt{p_{sp_d}} H_{sd} + 2\sqrt{p_{hp_v}} H_{hv} + 2p_h p$$
$$_d H_{hd} + 2\sqrt{p_{vp_d}} H_{vd}, \qquad (15)$$

The four pixels in question, designated $p_s$ for "self", $p_h$ for "horizontal", $p_v$ for "vertical", and $p_d$ for "diagonal", are shown in FIG. 7, and the approach follows that outlined above: the signal received at a given pixel is a sum of linear contributions from the three neighbors, plus interference terms between all of the pairs of amplitudes, as suggested by the subscripts in Equation 15. Each $H_{ij}$ term is now a function of both the x and y offsets, $\sigma_x$ and $\sigma_y$, respectively. FIG. 7A shows the case for which $\sigma_x$ and $\sigma_y$ are positive, so that $p_d$ sits above and to the left of $p_s$, and left-to-right processing solves for the intensities of all three of $p_d$, $p_v$, and $p_h$ before $p_s$ is considered. FIGS. 7B, 7C, and 7D correspond to the other possible scenarios.

As with the 1-D variant of the algorithm, each of these $H_{ij}$ parameters can be calculated or measured by imaging known patterns of discrete optical beams from the SLM pixel elements 22 onto the detector pixels 48. For example, to measure $H_{ss}(\sigma_x, 0)$ for $\sigma_x > 0$, one can measure the output from the first detector pixel to the right of the one for which the calculation is being made. In terms of FIG. 7A, this corresponds to the signal that would be received at $S_s$ when only $p_h$ is turned on. (For $\sigma_x < 0$, corresponding to FIGS. 7C and 7D, one can measure the output from the first pixel to the left of the one for which the calculation is being made.) To measure $H_{hs}(\sigma_x, 0)$ for $\sigma_x > 0$, one can measure output from the detector pixel to the right of the SLM pixel illuminated above, but with the SLM pixel to the right also ON. This corresponds to the intensity received in $S_s$ when both $p_s$ and $p_h$ are ON. If the system were linear, the signal received would now be identical to the sum of the $H_{ss}$ and $H_{hh}$ measurements. Since the system is not linear, however, there is a difference that is quantified by $H_{sh}$. Care must be taken to make sure the factors of 2 in Equations 4 and 15 are neither ignored nor double-counted.

When the ten $H_{ij}$ parameters in Equation 15 were determined using the holographic storage platform known as "DEMON2" (see J. Ashley et al., supra; and G. W. Burr et al., "Volume holographic data storage at an areal density of 250 Gigapixels/in$^2$", Optics Letters, 26(7):444–446, 2001), it was found that all of these two-dimensional data sets could be separated into x- and y-dependent functions. (The methods herein are intended to work with any number of holographic platforms.) As is evident from Equations 1 and 5, these $H_{ij}$ functions arise from integrating the convolution of the SLM pixel shape and the PSF of the optical system. The PSF can either be dominated by diffraction or by aberrations. In the former case, the PSF will simply be the Fourier transform of the limiting spatial aperture at or near the storage medium 10. If this aperture is described by a separable function (e.g., a square or rectangle), then the PSF will be separable (the product of a sinc function in x and a sinc function in y). If aberrations dominate, however, the PSF will be further convolved with the effects of spherical aberration, coma, and other aberrations, and may change in shape and size for different positions in the data page.

The fact that the $H_{ij}$ functions were found to be separable and roughly equal regardless of where on the data page they were measured implies that diffraction, not aberrations, dominated the PSF in the DEMON2 platform used. For this reason, intensities from the detector pixels were corrected by employing only the 1-D algorithm. The 1-D algorithm was used first in the x-dimension, and only after these calculations were made the data page was reprocessed by applying the 1-D algorithm in the y direction. (Alternatively, the 1-D algorithm may be applied first in the y direction, and then in the x direction.) This procedure is possible when the 2-D functions involved can be separated into x and y components. Thus each 2-D data page was processed with the 1-D algorithm four times: twice horizontally (as described above) for all rows to produce an intermediate page (yielding intensities that were corrected for all x shifts $\sigma_x$), and then twice vertically (top-to-bottom and bottom-to-top) on all columns of this intermediate page. (The ends of the columns were seeded to zero, in analogy with the methodology presented for rows, as discussed above.) Using a computer program (compiled C code) on a 600 MHz Pentium III, this took 2.5 seconds for a 1024×1024 data page.

Figure 8A:
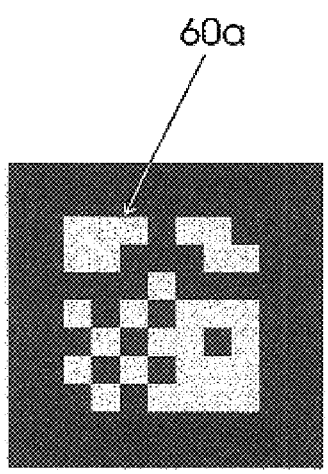
FIG. 8, which includes FIGS. 8A, B, and C, shows a 9×9 pixel pattern being imaged from a pixelated data page to a detector array (A) under perfect conditions, (B) with a half pixel offset in both the x and y dimensions, and (C) after processing the output signals from the detectors with a shift-compensation algorithm.
Figure 8B:
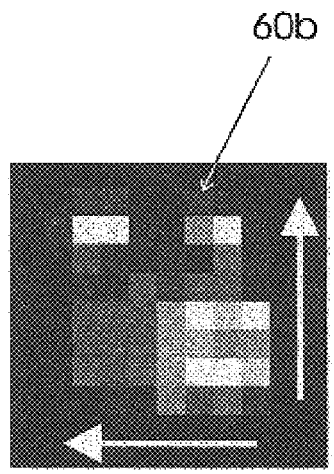
Figure 8C:
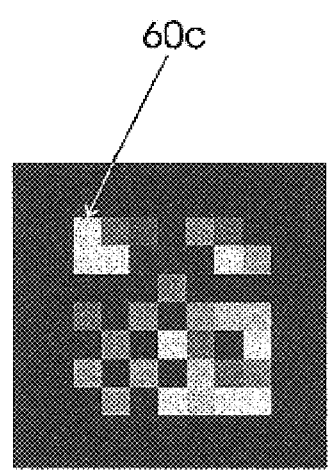

In FIG. 8A, a small 9×9 pixel block 60a shows bright and dark pixels corresponding to pixel intensities as they should ideally be received. FIG. 8B shows a pixel block 60b, which is the pattern of FIG. 8A imaged through the DEMON2 platform when the SLM is shifted a half-pixel in both x and y. The pixel block 60b shows pixels having intermediate levels of brightness. The DEMON2 platform pixel-matches megapel pages through an aperture of $1.36D_N$ (1.7×1.7 mm$^2$ aperture, effective focal length of Fourier optics f=30 mm, wavelength λ=532 nm, 1024×1024 SLM with square pixels of pixel pitch δ=12.8 μm). In FIG. 8C, a pixel block 60c is shown after the data of FIG. 8B has been processed with the shift-compensation algorithm to at least partially recover the information lost through misregistration. Note that the original binary pixel pattern could be accurately recovered by applying a single gray-level threshold to the grey pixels of FIG. 8C to distinguish bright and dark pixels. The very first implementation of the full 2-D algorithm described by Equation 15 using the DEMON2 holographic platform (note that the 2-D algorithm would have been mandated had aberrations dominated the PSF) gave results that were no better than those made with the 1-D algorithm. However, because the 1-D algorithm was simpler and worked quite well, it was sufficient to work with only the 1-D algorithm.

To process a block of pixels, the 1-D (or 2-D) algorithm needs only the total lateral shift, which is the sum of the dynamic misregistration and the static misregistration. The dynamic misregistration is that misregistration arising from errors in alignment affecting the entire detector array 44 (it is a "global" misregistration), e.g., the detector array may rest on a translation stage that is not brought into good alignment with the pixelated data page (propagating away from the SLM 18). Also, there may be changes between readouts due to mechanical vibrations or slow thermal drift of optical components. The static misregistration represents misregistration that is intrinsic to the optical system, e.g., offsets due to magnification error, material shrinkage, and optical distortion. In short, it is necessary to compensate not only for motion of the entire data page with respect to the detector array 44 (dynamic misregistration) but also for intrinsic distortions across the page (static misregistration). The dynamic shifts are determined between optical readouts by noting the location of dedicated fiducial marks within the pixelated data page and thus are updated every time a new page is read; the static misregistrations can be kept in a lookup table and are determined by calibration of the system. Such a calibration can be performed by detecting pages having known patterns of ON/OFF pixels under varying misregistrations, and for each small block of pixels within the data page (where a block represents, say, 10×10 pixels), selecting the $\sigma_x$, $\sigma_y$ values that minimize the BER after processing.

Figure 9:
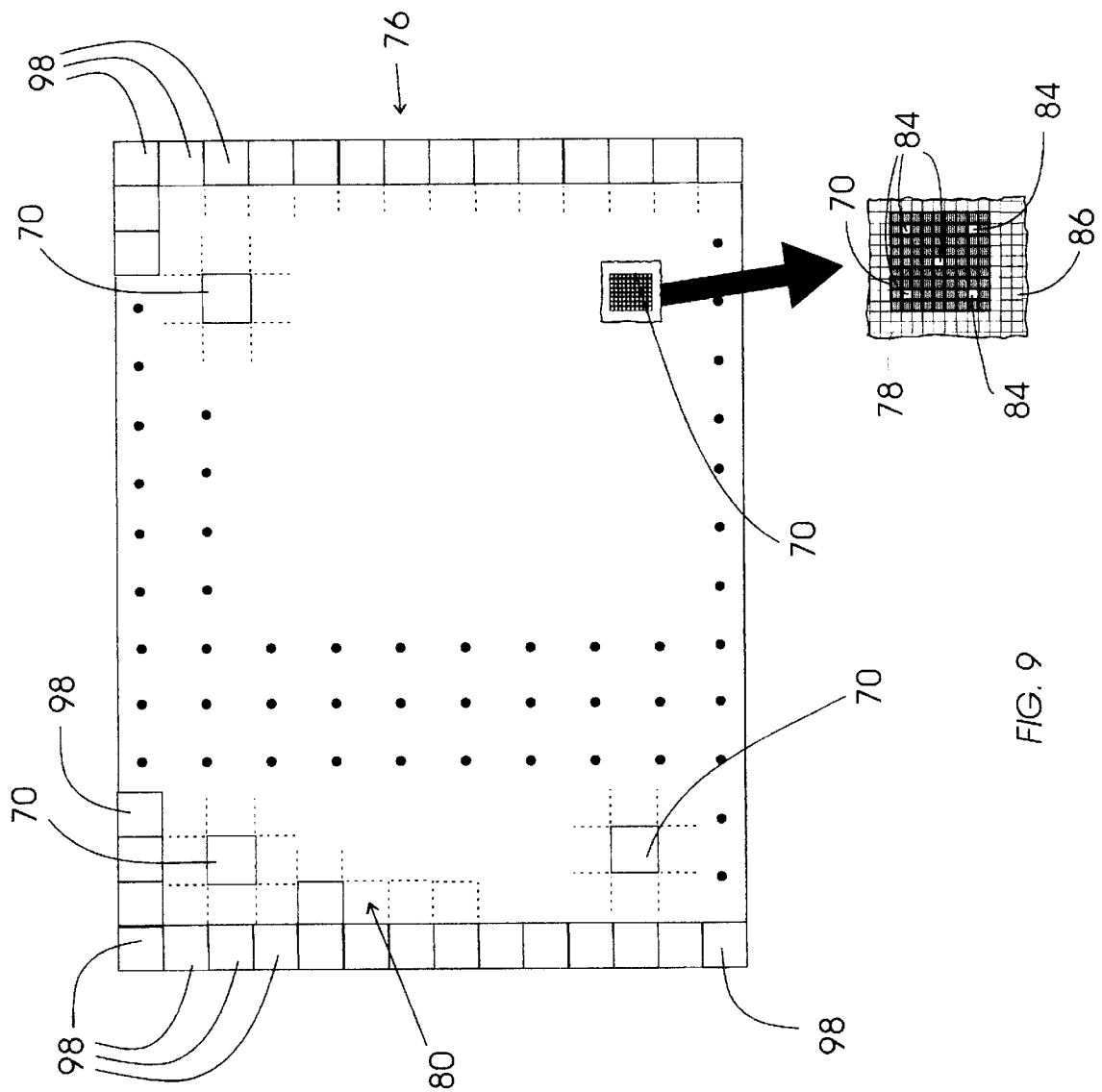
FIG. 9 shows how fiducial marks may be incorporated into a pixelated data page to determine misregistration between the data page and the pixels of a detector array.

FIG. 9 shows a data page 76 (which is the reconstructed object beam) divided conceptually into small blocks of data bits or "pixels" 78. Most of these blocks are data blocks 98 that are encoded to contain data and that are associated with an individual pair of static misregistrations (for the x and y dimensions, respectively) for that particular data block. In addition, the data page 76 includes fiducial blocks 70 strategically placed across the pixelated data page 76, such as the four blocks 70 shown in FIG. 9 arranged in the pattern of a square whose side is a reasonably large fraction of the page width. The data page 76, including the blocks 70, can be thought of as a page of pixels 78 corresponding to the SLM pixel elements 22 (which are associated with discrete optical beams such as 50a, 50b, 50c). A portion 80 of the data page 76 is dedicated to pixels having encoded data, whereas another portion is set aside for fiducial purposes. The fiducial portion (comprising the blocks 70) includes isolated on-pixels 84 surrounded by pixels 86 that are OFF. Thus, the fiducial blocks 70 are made up mostly of OFF (dark) pixels 86 and a few, isolated ON pixels 84 widely separated from each other. This wide separation allows the optical beams associated with each of the pixels 84 propagating onto the detector array 44 to be computed by determining the center of the light falling onto the detector pixels 48 at and around the "target" detector pixel (i.e., the pixel that would, in the absence of misregistration, receive all the light from its respective ON pixel). This determines the translation of the data page 76 relative to the detector array 44. If detector pixels to the left and to the right of the target pixel receive the same optical intensity from an ON pixel 84, then that ON pixel is taken to be centered in the x-direction; a weighted average can be used for this purpose. An analogous procedure can be used for the y-direction.

The OFF pixels 86 guarantee that when the centroid of an discrete optical beam is computed, only light originating from a single pixel in the SLM is used, so that neighboring pixels do not contribute signal through interpixel crosstalk. Each fiducial block 70 thus provides an x and a y offset in units of pixels, and these offsets can be averaged over the fiducial blocks on the page to determine the dynamic misregistration of the data page 76 with respect to the detector array 44.

On the other hand, the static misregistrations between each data block 98 and its associated detector pixels 48 need to be calibrated for each block 98 of data pixels. These static misregistrations can be thought of as the x, y offsets associated with the best alignment position for that particular block. Thus, if a particular block 98 has a static misregistration or "local" x, y offset of (0.1, 0.2), this implies that this data block would have been perfectly aligned with its intended detector pixels 48 if the dynamic (global) misregistration had been (−0.1, −0.2). For a dynamic misregistration of (0.4, 0.3), as determined by the fiducial blocks 70, this same block would be misaligned by exactly half a pixel in both the x and y dimensions. A set of total misregistrations $\sigma_x$, $\sigma_y$, between the detector elements 48 and the pixels 78 of the data page 76 (corresponding to the SLM pixel elements 22 and their associated optical beams, such as 50a, 50b, 50c) may be computed by adding the dynamic misalignment to the static misregistrations.

In one implementation of the algorithm, pairs of static (local) x and y offsets, $\sigma_x$ and $\sigma_y$, respectively, with a resolution of 0.025 pixel, were calculated for each block of 10×10 pixels across a megapel data page. Thus, the $H_{ij}$ lookup tables contained one entry for each 0.025 pixel increment, requiring 21 values to cover $\sigma_{x,y}$ from 0 to 0.5. No values are expressly listed to cover 0 to −0.5 because the left-to-right or right-to-left nature of the pass already accounts for which pixel the shift correction is applied to. In other words, the $H_{01}$ ($\sigma$=0.25) value used in Equation 4 is identical to the $H_{01}$($\sigma$=−0.25) value used in Equation 14. One set of $H_{ij}$ ($\sigma_{x,y}$) values was used across the entire page, measured as described above. Values for the row-by-row correction of x shifts based on $\sigma_x$, and values for the column-by-column correction of y shifts based on $\sigma_y$ were stored separately. Note that it might be expected that with a square Fourier transform aperture and square SLM pixels, the system should be symmetric. However, the $H_{ij}(\sigma_x)$ and $H_{ij}(\sigma_y)$ values were measured and found to be different in this particular implementation. This implies that the detector pixels 48 were not exactly square for the CCD detector array 44 in this particular implementation. (Evidently, the symmetry of the detector pixels 48 was intentionally broken by the designer in order to accommodate improved CCD readout.) This makes the value of $ff_d$ used in Equations 5–7 different for the x and y dimensions. Thus, for each dimension, there were three lookup tables, corresponding to $H_{00}$, $H_{01}$, and $H_{11}$, each with 21 unique values to cover $0<|\sigma|<0.5$.

Figure 10A:
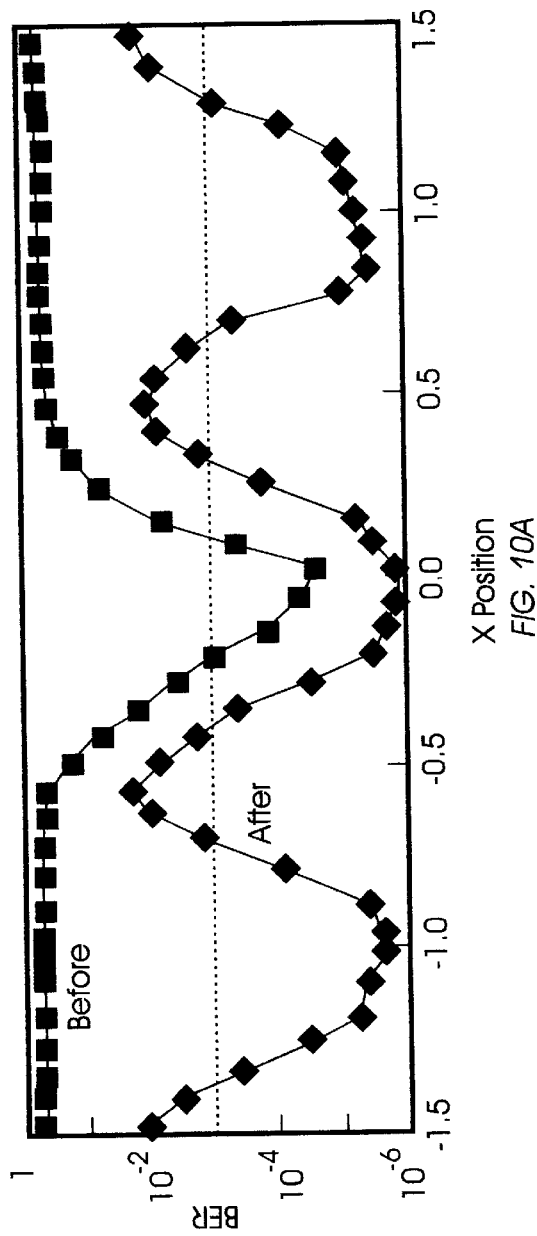
FIG. 10, which includes FIGS. 10A, B, and C shows raw BER (bit error rate) with an 8:12 modulation code before and after shift-compensation processing of the output signals from the detector pixels as a function of A) shift in the x-dimension, B) shift in the y-dimension, and C) shift along the x=−y diagonal.
Figure 10B:
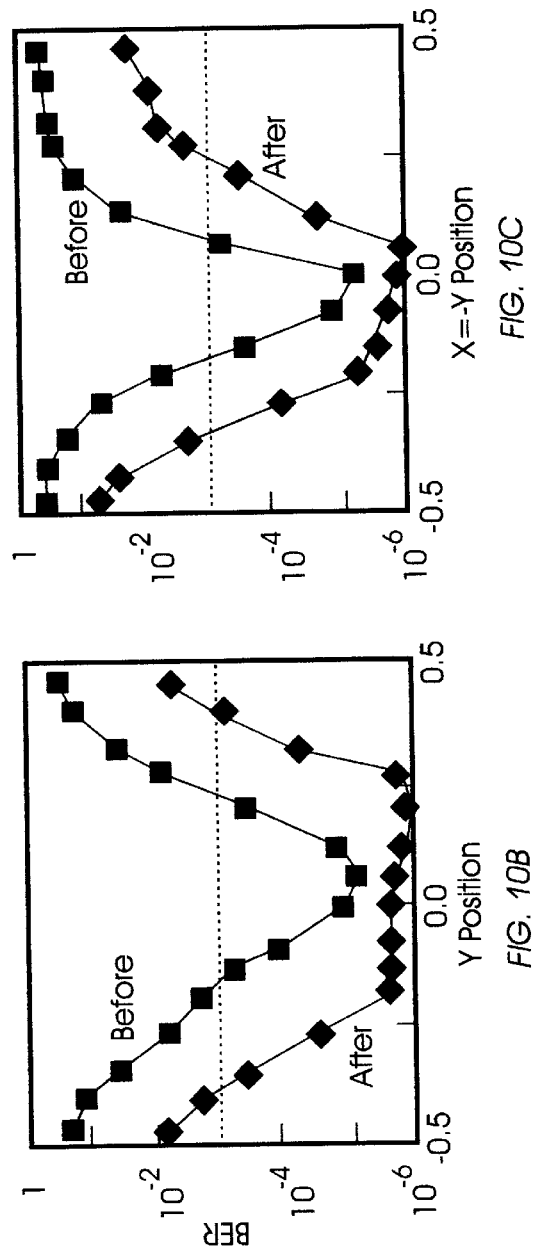
Figure 10C:
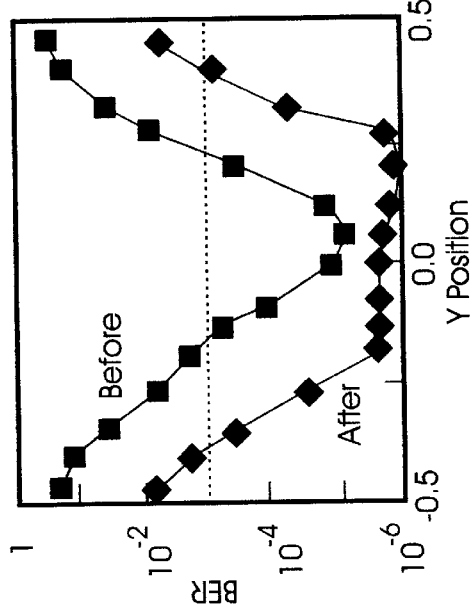

FIGS. 10A, B, and C show the resulting page-wide performance for images transmitted through the DEMON2 system as a function of x misalignment, y misalignment, and for the case when the misalignment in the x and y dimensions are equal. Similar results have been demonstrated with holograms stored at areal densities up to 250 Gbit/sq. in. (See G. W. Burr et al., "Volume holographic data storage at an areal density of 250 Gigapixels/in$^2$", Optics Letters, 26(7):444–446, 2001). The raw-BER (bit error rate) was measured, both before and after applying the shift-compensation algorithm, at the output of an 8-bits-from-12-pixels modulation decoder into which signal outputs were fed. (For a discussion of modulation decoding, see G. W. Burr, J. Ashley, H. Coufal, R. K. Grygier, J. A. Hoffnagle, C. M. Jefferson, and B. Marcus, "Modulation coding for pixel-matched holographic data storage", Optics Letters, 22(9):639–641, 1997.) As expected, the BER increases when either $|\sigma_x|$ or $|\sigma_y|$ is near 0.5, and decreases again for pixel shifts close to ±1. Assuming that $10^{-3}$ is the maximum acceptable raw-BER that can be corrected by error-correction codes (see M. A. Niefeld et al., "Error correction for increasing the usable capacity of photorefractive memories", Optics Letters, vol. 19, no. 18, pp. 1483–1485, 1994), FIG. 10 shows that the position tolerance in x and y for this particular implementation increases from ±16% to ±40% of the pixel pitch when the shift-compensation algorithm is applied. For example, without the algorithm, the x or y alignment must be within ±16% of the pixel pitch, or 1.92 microns when the pixel pitch is 12 microns. By using the compensation algorithm procedure described herein, greater misalignment is possible while still getting acceptable BER.

As discussed above, one of the factors leading to high BER at $|\sigma|\sim 0.5$ is error-propagation, since noise-induced errors in the signal have a strong influence on the calculated intensities. One way to reduce this error is to insert rows and columns of OFF pixels within the data page 76 so that the algorithm can re-seed itself, thereby ensuring that errors from one pixel do not propagate across the page as the algorithm is iteratively carried out from pixel to pixel. Since these OFF pixels cannot encode data, this trades off code rate for improved performance. Inserting rows and columns of OFF pixels also permits parallel execution, reducing the buffer size and processing latency. Alternatively, one could intentionally introduce a small (~1%) magnification error, so that $\sigma_x$ and $\sigma_y$ vary quickly through $|\sigma|\sim 0.5$ in small isolated patches. This decreases the length of continuous pixel sections with large correction factors, thus reducing error propagation.

Additionally, Equation 4 could simply be used as an improved channel model within existing parallel detection (see B. M. King et al., 1998, supra) and sequence-estimation schemes. This reference describes post-processing algorithms that try to determine the data patterns originally stored with an SLM by comparing the measured data against a modeled prediction of what each possible stored data pattern would have produced. In this context, Equation 4 represents an improved model for generating candidate distorted outputs for comparison with the actual measured output. Such algorithms typically choose the input that leads to the distorted output most closely resembling the measured data, so that a model that more closely follows the actual physics can offer over improved performance over the inaccurate but simple linear channel model.

In one embodiment of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A processor-implemented method of determining the intensities of beams of coherent electromagnetic radiation, wherein the beams form an array, comprising:
   providing an array of detectors;
   imaging the array of beams onto the array of detectors to generate output signals from the detectors;
   detecting the output signals to record respective output signal levels;
   determining misregistration between the detectors and the beams; and
   using a processor to correct the recorded output signal levels by compensating for electromagnetic interference effects at the detectors arising from the misregistration, so that the corrected output signals levels are proportional to those that would be recorded in the absence of misregistration.

2. The method of claim 1, wherein the detector array is a two-dimensional array of pixels.

3. The method of claim 2, wherein the array includes at least 1024×1024 pixels.

4. The method of claim 2, wherein the array includes at least 1024×768 pixels.

5. The method of claim 1, wherein the coherent radiation includes laser light.

6. The method of claim 1, said determining the misregistration comprising:
   determining a set of static misregistrations between the detectors and the beams;
   determining any dynamic misalignment between the array of detectors and the array of beams; and
   determining a set of total misregistrations between the detectors and the beams from the dynamic misregistration and the set of static misregistrations.

7. The method of claim 6, wherein determining the dynamic misalignment between the array of detectors and the array of beams includes identifying the location of fiducial images on the detector array.

8. The method of claim 1, said imaging comprising directing a beam of laser light through a holographic storage medium to reconstruct the array of beams.

9. The method of claim 1, said compensating comprising, for each detector, determining the convolution of the optical point spread function (PSF) of beams in the array and the detector's area.

10. The method of claim 9, said compensating comprising performing iterative calculations in a first spatial dimension for detectors along a given row aligned along the first spatial dimension.

11. The method of claim 10, said compensating further comprising performing iterative calculations in the first spatial dimension for detectors along additional rows aligned along the first spatial dimension.

12. The method of claim 11, said compensating further comprising performing iterative calculations in a second spatial dimension for detectors along rows aligned with the second spatial dimension.

13. A processor-implemented method of correcting errors arising from interpixel cross talk in the detection of a reconstructed holographic data image, the data image being comprised of a two dimensional grid of bit images arranged in rows and columns, comprising:
   providing a detection device having a grid of detector pixels, the detector pixels corresponding to and detecting the bit images;
   directing the data image onto the detector pixels by passing coherent electromagnetic radiation through a holographic storage medium;
   measuring output signals from the detector pixels;
   determining any misregistration between the pixels and the bit images; and
   using a processor to correct the measured output signals to compensate for signal strength lost to or gained by nearby pixels through interference effects resulting from the misregistration, thereby producing a calculated data image that is substantially corrected for interpixel crosstalk.

14. The method of claim 13, said determining any misregistration comprising:
   determining any dynamic misalignment between the image grid and the pixel grid; and
   determining any static misregistrations between the bit images and the pixels.

15. The method of claim 13, said correcting comprising:
   (a) for each pixel in a given row of pixels, adding to the output signal measured at that pixel any signal lost through interference effects to neighboring pixels in the given row;
   (b) for each pixel in the given row, subtracting from the output signal measured at that pixel any signal gained through interference effects from neighboring pixels in the given row; and
   (c) applying (a) and (b) to additional rows of pixels, thereby producing a data image of revised output signals.

16. The method of claim 15, comprising:
   (d) for each pixel in a given column of pixels, adding to the revised output signal for that pixel any signal lost through interference effects to neighboring pixels in the given column;
   (e) for each pixel in the given column, subtracting from the revised output signal for that pixel any signal gained through interference effects from neighboring pixels in the given column; and
   (f) applying (d) and (e) to additional columns of pixels.

17. The method of claim 13, said correcting comprising:

(a) for each pixel in a given column of pixels, adding to the output signal measured at that pixel any signal lost through interference effects to neighboring pixels in the given column;

(b) for each pixel in the given column, subtracting from the output signal measured at that pixel any signal gained through interference effects from neighboring pixels in the given column; and (c) applying (a) and (b) to additional columns of pixels, thereby producing a data image of revised output signals.

18. The method of claim 17, comprising:

(d) for each pixel in a given row of pixels, adding to the revised output signal for that pixel any signal lost through interference effects to neighboring pixels in the given row;

(e) for each pixel in the given row, subtracting from the revised output signal for that pixel any signal gained through interference effects from neighboring pixels in the given row; and (f) applying (d) and (e) to additional rows of pixels.

19. The method of claim 13, comprising:

iteratively processing the output signals from the detector pixels along a first dimension to produce an intermediate page of intensities; and processing said intermediate page intensities along a second dimension to produce the calculated data image.

20. The method of claim 13, comprising imaging patterns of discrete bit images onto the detector pixels to determine the extent of the interference effects resulting from misregistrations between detector pixels and their respective bit images.

21. The method of claim 13, comprising:

iteratively processing output signals back and forth along each row to generate respective revised data signals; and iteratively processing output signals back and forth along each column to generate respective revised data signals, wherein only those revised data signals for which pixel offsets are less than or equal to one-half of the pixel spacing are retained.

22. The method of claim 13, comprising:

iteratively processing output signals back and forth along each row to generate respective revised data signals; and iteratively processing output signals back and forth along each column to generate respective revised data signals, wherein, for at least some detector pixels, an average of the revised data signals is calculated.

23. The method of claim 13, further comprising including blank rows and columns in the data image to facilitate said correcting of the measured output signals.

* * * * *

UNITED STATES PATENT AND TRADEMARK OFFICE
CERTIFICATE OF CORRECTION

PATENT NO. : 6,697,316 B2
DATED : February 24, 2004
INVENTOR(S) : Geoffrey W. Burr It is certified that error appears in the above-identified patent and that said Letters Patent is hereby corrected as shown below:

Column 9,
Replace equation (4) with:

$$(4) \quad S_2 = p_2 H_{00}(\sigma_x) + 2\sqrt{p_1 p_2} H_{01}(\sigma_x) + p_1 H_{11}(\sigma_x).$$

Column 11,
Replace equation (14) with:

$$(14) \quad S_2 = p_2 H_{00}(\sigma_x) + 2\sqrt{p_3 p_2} H_{01}(\sigma_x) + p_3 H_{11}(\sigma_x).$$

Column 12,
Replace equation (15) with:

$$(15) \quad S_s = p_s H_{ss} + p_h H_{hh} + p_v H_{vv} + p_d H_{dd} + 2\sqrt{p_s p_h} H_{sh} + 2\sqrt{p_s p_v} H_{sv} + 2\sqrt{p_s p_d} H_{sd} + 2\sqrt{p_h p_v} H_{hv} + 2\sqrt{p_h p_d} H_{hd} + 2\sqrt{p_v p_d} H_{vd},$$

Signed and Sealed this

Fourteenth Day of September, 2004

JON W. DUDAS
*Director of the United States Patent and Trademark Office*